US012573405B2

(12) United States Patent
Robert Jose

(10) Patent No.: US 12,573,405 B2
(45) Date of Patent: *Mar. 10, 2026

(54) WORD CORRECTION USING AUTOMATIC SPEECH RECOGNITION (ASR) INCREMENTAL RESPONSE

(71) Applicant: Adeia Guides Inc., San Jose, CA (US)

(72) Inventor: Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,021

(22) Filed: Apr. 5, 2023

(65) Prior Publication Data

US 2023/0252997 A1 Aug. 10, 2023

Related U.S. Application Data

(63) Continuation of application No. 17/384,970, filed on Jul. 26, 2021, now Pat. No. 11,651,775, which is a continuation of application No. 16/408,260, filed on May 9, 2019, now Pat. No. 11,107,475.

(51) Int. Cl.
| | |
|---|---|
| *G10L 15/32* | (2013.01) |
| *G10L 15/08* | (2006.01) |
| *G10L 15/18* | (2013.01) |
| *G10L 15/22* | (2006.01) |

(52) U.S. Cl.
CPC .......... *G10L 15/32* (2013.01); *G10L 15/1815* (2013.01); *G10L 15/22* (2013.01); *G10L 2015/088* (2013.01); *G10L 2015/223* (2013.01)

(58) Field of Classification Search
CPC ..... G10L 15/32; G10L 15/1815; G10L 15/22; G10L 2015/088; G10L 2015/223; G10L 15/183; G10L 2015/228
See application file for complete search history.

(56) References Cited

U.S. PATENT DOCUMENTS

| | | | | |
|---|---|---|---|---|
| 4,805,219 A | * | 2/1989 | Baker | .................... G10L 15/00 704/240 |
| 5,566,272 A | | 10/1996 | Brems et al. | |
| 5,761,687 A | * | 6/1998 | Hon | ..................... G06F 40/232 715/271 |
| 6,122,613 A | * | 9/2000 | Baker | .................... G10L 15/22 704/E15.04 |

(Continued)

FOREIGN PATENT DOCUMENTS

EP 2838085 A1 2/2015

OTHER PUBLICATIONS

PCT International Search Report for International Application No. PCT/US2020/032148, dated Jul. 1, 2020 (13 pages).

*Primary Examiner* — Michael Colucci
(74) *Attorney, Agent, or Firm* — HG LAW LLP

(57) ABSTRACT

An exemplary automatic speech recognition (ASR) system may receive an audio input including a segment of speech. The segment of speech may be independently processed by general ASR and domain-specific ASR to generate multiple ASR results. A selection between the multiple ASR results may be performed based on respective confidence levels for the general ASR and domain-specific ASR. As incremental ASR is performed, a composite result may be generated based on general ASR and domain-specific ASR.

20 Claims, 8 Drawing Sheets

200

(56)                  References Cited

U.S. PATENT DOCUMENTS

| | | | | |
|---|---|---|---|---|
| 8,650,031 | B1 * | 2/2014 | Mamou | G06F 16/00 |
| | | | | 707/738 |
| 8,775,177 | B1 * | 7/2014 | Heigold | G10L 15/10 |
| | | | | 704/270.1 |
| 8,972,253 | B2 | 3/2015 | Deng et al. | |
| 9,336,771 | B2 * | 5/2016 | Chelba | G10L 15/063 |
| 11,081,104 | B1 * | 8/2021 | Su | G06F 40/216 |
| 11,107,475 | B2 | 8/2021 | Robert Jose | |
| 11,138,205 | B1 * | 10/2021 | Mohajer | G06F 16/2455 |
| 11,651,775 | B2 | 5/2023 | Robert Jose | |
| 2004/0220813 | A1 | 11/2004 | Weng et al. | |
| 2004/0249634 | A1 * | 12/2004 | Degani | G10L 17/26 |
| | | | | 704/207 |
| 2004/0260543 | A1 * | 12/2004 | Horowitz | G10L 15/26 |
| | | | | 704/E15.04 |
| 2008/0004877 | A1 * | 1/2008 | Tian | G10L 15/197 |
| | | | | 704/251 |
| 2010/0305947 | A1 * | 12/2010 | Schwarz | G10L 15/1815 |
| | | | | 704/E15.001 |
| 2011/0055256 | A1 * | 3/2011 | Phillips | G06F 16/9535 |
| | | | | 707/769 |
| 2011/0283189 | A1 * | 11/2011 | McCarty | H04N 21/4532 |
| | | | | 715/810 |
| 2012/0265819 | A1 * | 10/2012 | McGann | G06Q 10/00 |
| | | | | 709/204 |
| 2013/0073286 | A1 * | 3/2013 | Bastea-Forte | G10L 15/22 |
| | | | | 704/244 |
| 2013/0289987 | A1 * | 10/2013 | Ganapathiraju | G10L 15/08 |
| | | | | 704/236 |
| 2014/0191939 | A1 * | 7/2014 | Penn | G06F 3/015 |
| | | | | 345/156 |
| 2014/0270114 | A1 * | 9/2014 | Kolbegger | H04M 3/5166 |
| | | | | 379/88.08 |
| 2015/0012271 | A1 * | 1/2015 | Peng | G10L 15/08 |
| | | | | 704/235 |
| 2015/0120296 | A1 * | 4/2015 | Stern | G10L 15/30 |
| | | | | 704/236 |
| 2015/0169284 | A1 * | 6/2015 | Quast | G06F 16/9535 |
| | | | | 704/275 |
| 2016/0140956 | A1 | 5/2016 | Yu et al. | |
| 2017/0140752 | A1 * | 5/2017 | Sugitani | G10L 15/32 |
| 2018/0082677 | A1 * | 3/2018 | Yaghi | G06N 3/045 |
| 2018/0096678 | A1 * | 4/2018 | Zhou | G10L 15/32 |
| 2018/0211652 | A1 * | 7/2018 | Mun | G10L 15/187 |
| 2019/0013008 | A1 * | 1/2019 | Kunitake | G10L 15/08 |
| 2020/0160838 | A1 * | 5/2020 | Lee | G10L 15/183 |
| 2020/0310749 | A1 * | 10/2020 | Miller | G06F 3/167 |
| 2020/0357412 | A1 | 11/2020 | Robert Jose | |
| 2021/0350807 | A1 | 11/2021 | Robert Jose | |
| 2023/0252997 | A1 | 8/2023 | Robert Jose | |

* cited by examiner

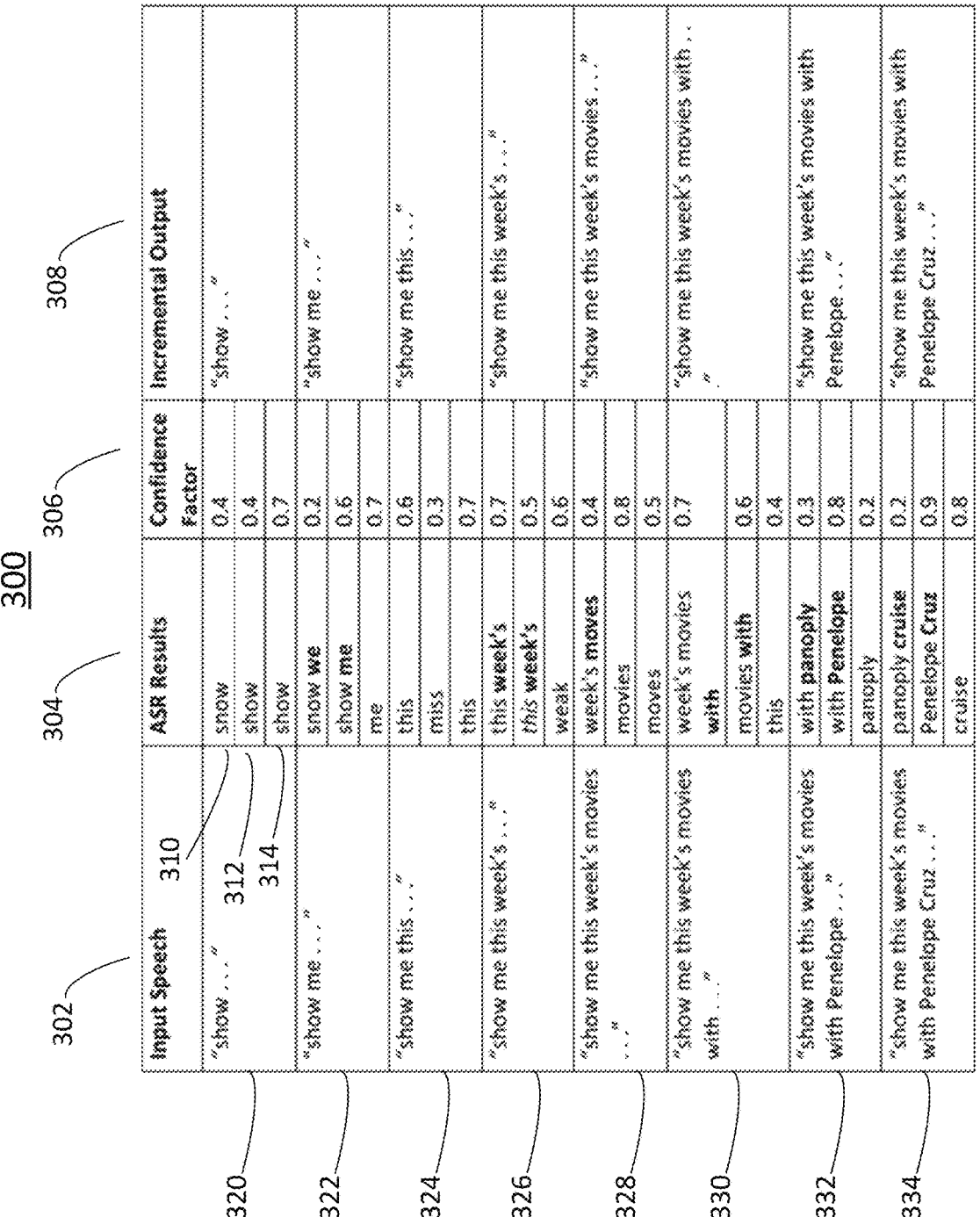

| | Input Speech | ASR Results | Confidence Factor | Incremental Output |
|---|---|---|---|---|
| | 302 | 304 | 306 | 308 |
| 320 | "show . . . ." | show<br>show<br>show | 0.4<br>0.4<br>0.7 | "show . . . ." |
| 322 | "show me . . ." | show we<br>show me | 0.2<br>0.6 | "show me . . . ." |
| 324 | "show me this . . ." | me<br>this<br>miss<br>this | 0.7<br>0.6<br>0.3<br>0.7 | "show me this . . . ." |
| 326 | "show me this week's . . ." | this week's<br>this week's<br>weak | 0.7<br>0.5<br>0.6 | "show me this week's . . . ." |
| 328 | "show me this week's movies . . ." | week's movies<br>movies<br>moves | 0.4<br>0.8<br>0.5 | "show me this week's movies . . . ." |
| 330 | "show me this week's movies with . . ." | week's movies with<br>movies with<br>this<br>with | 0.7<br>0.6<br>0.4 | "show me this week's movies with . . . ." |
| 332 | "show me this week's movies with Penelope . . ." | with panoply<br>with Penelope<br>panoply | 0.3<br>0.8<br>0.2 | "show me this week's movies with Penelope . . . ." |
| 334 | "show me this week's movies with Penelope Cruz . . ." | panoply cruise<br>Penelope Cruz<br>cruise | 0.2<br>0.9<br>0.8 | "show me this week's movies with Penelope Cruz . . . ." |

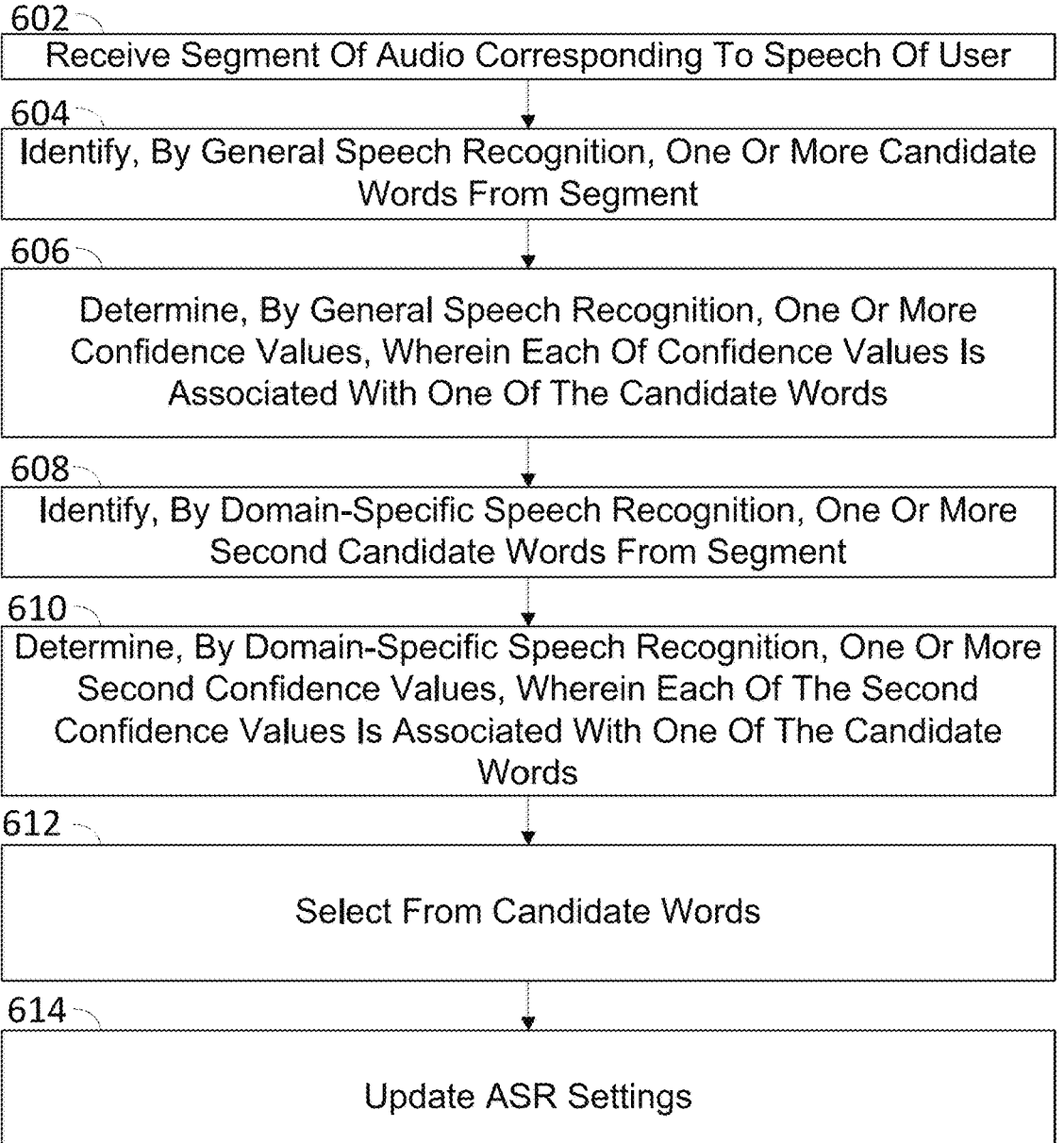

602
Receive Segment Of Audio Corresponding To Speech Of User

604
Identify, By General Speech Recognition, One Or More Candidate Words From Segment 606
Determine, By General Speech Recognition, One Or More Confidence Values, Wherein Each Of Confidence Values Is Associated With One Of The Candidate Words 608
Identify, By Domain-Specific Speech Recognition, One Or More Second Candidate Words From Segment 610
Determine, By Domain-Specific Speech Recognition, One Or More Second Confidence Values, Wherein Each Of The Second Confidence Values Is Associated With One Of The Candidate Words 612
Select From Candidate Words 614
Update ASR Settings

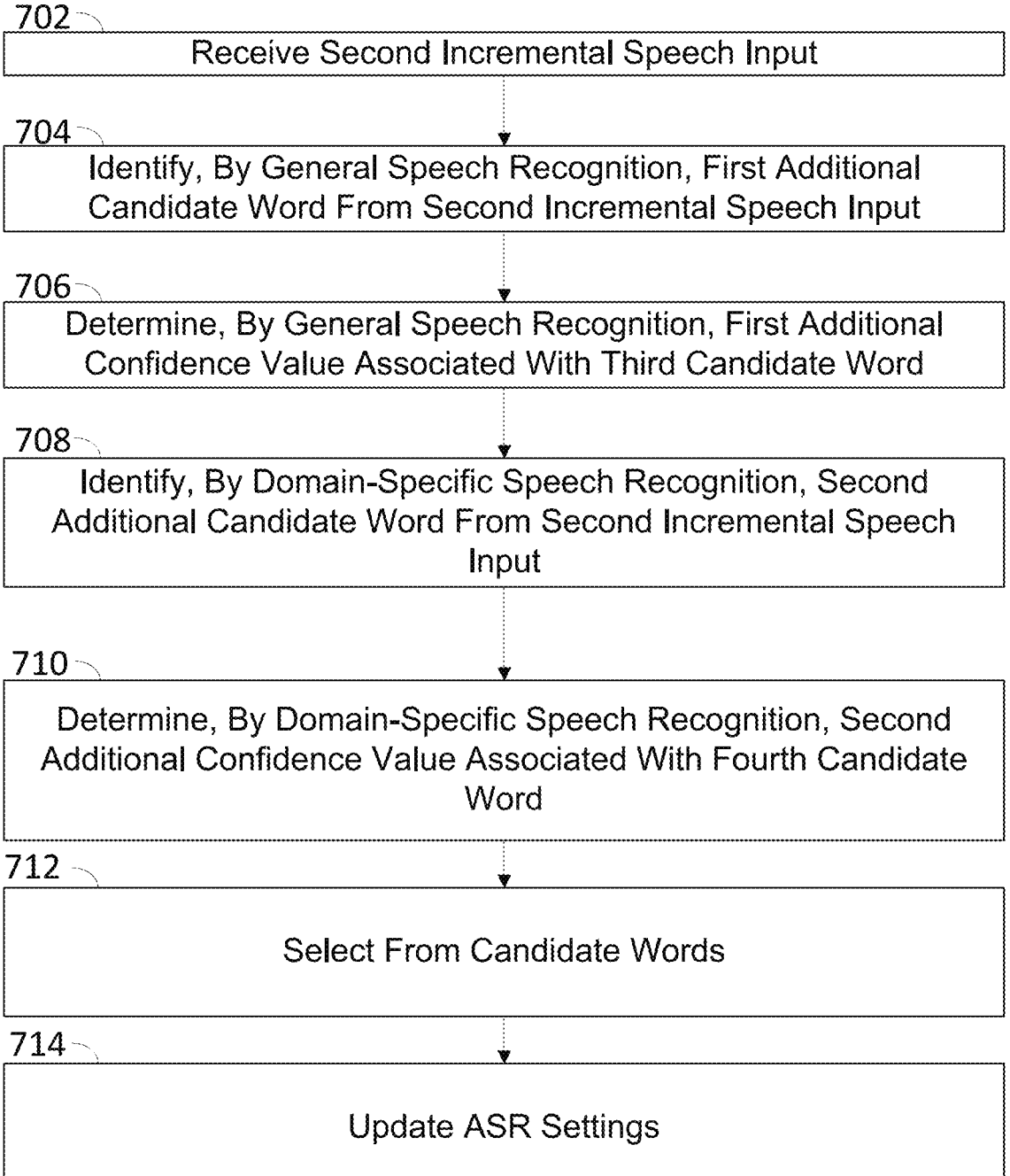

702
Receive Second Incremental Speech Input

704
Identify, By General Speech Recognition, First Additional Candidate Word From Second Incremental Speech Input 706
Determine, By General Speech Recognition, First Additional Confidence Value Associated With Third Candidate Word 708
Identify, By Domain-Specific Speech Recognition, Second Additional Candidate Word From Second Incremental Speech Input 710
Determine, By Domain-Specific Speech Recognition, Second Additional Confidence Value Associated With Fourth Candidate Word 712
Select From Candidate Words 714
Update ASR Settings

Update At Least One Of First Plurality Of Confidence Values Or One Of Second Plurality Of Confidence Values Based On Second Incremental Speech Input

804

Update Selections Based On Updated At Least One Confidence Value

806

Update Identified Plurality Of Words For Segment Based On Updated Selections

WORD CORRECTION USING AUTOMATIC SPEECH RECOGNITION (ASR) INCREMENTAL RESPONSE

CROSS-REFERENCE TO RELATED APPLICATIONS

This application is a continuation of U.S. patent application Ser. No. 17/384,970, filed Jul. 26, 2021, which is a continuation of U.S. patent application Ser. No. 16/408,260, filed May 9, 2019, now U.S. Pat. No. 11,107,475, which are hereby incorporated by reference herein in their entireties.

BACKGROUND

The present disclosure is directed to systems for performing automatic speech recognition (ASR), and in particular, for performing domain-related ASR.

SUMMARY

An increasing number of systems and devices utilize ASR to interact with a user, for example, to process user speech to identify commands or other interactions with the system or device. ASR is implemented in smart devices such as phones, tablets, watches, speakers, televisions, and appliances. Vehicles, public transportation and infrastructure, and customer service systems utilize ASR for processing user or customer speech. Thus, ASR integrations are increasingly interacting with more aspects of users' lives and for increasingly broad purposes in an increasingly narrow set of applications.

ASR systems actively listen to audio, and when a verbal input is detected, the ASR system performs speech-to-text conversion and returns recognized text. In an incremental response ASR model, the ASR system provides an entire sequence including some resolved words and also words that include intermediate predicted possibilities. As ASR is increasingly used in particular sub-domains (e.g., niche applications executing on a smart device), the ASR outputs may be more likely to depart from the user's intention. For example, error correction and selection between possible results typically occurs based on a corpus of training data, and further based on inferences that can be drawn from generated phonetic variations of the input speech and a model created based on the training data.

In some embodiments of the present disclosure, a speech recognition system (e.g., speech recognition software executing on a device) recognizes that it is operating in a particular domain, such as operation of a motor vehicle, a kiosk in a grocery store, customer service for a particular product, or a media guidance application. The system may employ domain-specific ASR based on the particular domain, for example, that biases results based on the vocabulary and usage peculiar to a particular domain. The system may also employ a general ASR that processes results based on general speech vocabulary and usage, for example, related to the user's language, dialect, location, and other non-domain-specific factors.

When a user speaks, the speech segment may be received by a monitoring component such as a microphone and provided to control circuitry (e.g., of a device including the microphone, or in some embodiments, a remote device such as a server). The control circuitry processes the received speech segment using both the general ASR and the domain-specific ASR, for example, by processing the same speech segment through both ASRs in parallel. Each ASR outputs respective candidate words for the speech segment along with confidence values (e.g., corresponding to edit distances between processed speech data and respective words and/or phrases) for the candidate words. Additional weighting may be provided to the outputs, for example, based on how closely the user is adhering to the domain (e.g., based on high confidence values for previous domain-specific results or a user selection to weight heavily for domain-specific speech). A composite plurality of words may be identified based on the candidate words and the confidence values (weighted, as appropriate) from the respective ASRs, resulting in a speech output that accurately captures domain-specific words and also captures general conversational words. In this manner, a user can speak normally, i.e., without resorting to excessive domain-specific speech patterns and without foregoing accuracy of domain-specific portions of the overall output. The resulting output may then be used for a variety of tasks and functions, for example, based on the end use device and the domain. In an exemplary media guidance application, the user may interact with the media guidance application conversationally to prompt queries and searches, display and playback of media, acquisition of supplemental information for a displayed media asset or actor, interaction with advertisements, coordination with parental control settings, and numerous other related functions.

In some embodiments, the multiple ASR speech recognition system may process incremental speech inputs that are updated dynamically as speech is received and processed, while the user is speaking. As each new incremental segment of speech is received, the processing of the newly received speech identifies new candidate words and confidence values for the general ASR and domain-specific ASR and selects between the candidate words based on confidence values as described herein. In some embodiments, the general ASR and domain-specific ASR are sequence aware, such that current confidence values (e.g., based on edit distances) are partially based on preceding words and phrases that may be formed by combinations therewith. In the context of domain-specific ASR, the phrases may be domain-specific. Previously selected words may also be modified based on the newly identified words and their relations to phrases, as well as respective confidence values for individual words and phrases. In some instances, a previous selection between a general ASR output and domain-specific ASR may be updated.

In some embodiments, a variety of metrics may be used as confidence values. For example, an initial output of a speech recognition algorithm may result in a set of characters or phonemes that can be compared to possible words, for example, based on an edit distance between the initial output and each of the possible words. A match may be made from the possible words, and a final confidence value may be assigned, for example, based on the edit distance with the matched word and the relative edit distance as compared to other possible words that were not selected. In an exemplary embodiment of a domain-specific ASR for a media guidance application, the possible words used for matching may be based at least in part on media guidance metadata, which in turn may be structured into categories relevant to media guidance applications such as genre, actors, characters, directors, studio, format, resolution, source, provider, cost, playback time, user preferences, rankings, social scoring, and other similar factors relating to the management and delivery of media assets to a user.

In some embodiments, the sequence aware ASR and sequence unaware ASR may be performed in parallel, and for one or both of the general and domain-specific ASR, such that the selection between candidate words includes multiple sets of results. For example, some words or phrases may be identified by a sequence aware ASR based on general assumptions of speech recognition algorithms with respect to common phrases, speech structures, or colloquialisms. Speech that does not conform to these assumptions (e.g., dialects, accented speech, speech from language learners, new vocabulary, and the like) may result in low confidence for a sequence aware ASR that is attempting to fit the speech into generalized patterns in some instances, whereas a sequence unaware ASR may identify the individual words accurately. In this manner, a larger set of users may be able to interact with speech recognition in a conversational manner.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 3 shows an illustrative embodiment of incremental speech processing with multiple ASRs, in accordance with some embodiments of the disclosure;

FIG. 6 is a flowchart of a process for processing of input speech using multiple ASRs, in accordance with some embodiments of the disclosure;

FIG. 7 is a flowchart of a process for incremental processing of input speech using multiple ASRs, in accordance with some embodiments of the disclosure.

DETAILED DESCRIPTION

The present disclosure is related to recognition of speech using results from multiple ASRs to generate a composite speech output, for example, for real-time incremental speech recognition of conversational speech. A speech recognition system may utilize both general ASR and domain-specific ASR, as well as sequence aware ASR and sequence unaware ASR (e.g., for one or both of the general ASR and domain-specific ASR). In an exemplary embodiment as described herein, a media guidance system may utilize sequence aware general ASR, sequence aware domain-specific ASR, and sequence unaware general ASR. It will be understood, however, that other ASR combinations may be used in other applications based on the disclosure provided herein.

In an exemplary embodiment, each segment of incremental speech may be provided to each of the three ASRs and processed in parallel and/or asynchronously such that each of the ASRs outputs one or more candidate words along with confidence values that are associated with the candidate words. In exemplary embodiments as described herein, a confidence value may correspond to a zero-to-one score with zero corresponding to a lowest confidence level and one corresponding to a highest confidence level. Other scales may be used rather than a zero-to-one scale, and confidence values can be represented in manners other than scores, such as vector representations of respective edit distances.

Prior to providing a result for the segment of incremental speech (e.g., as an input to command dialogue, an input to a search query, or an output for display), the system may consider each of the respective candidate words and confidence values. In some embodiments, biasing factors may also be applied to the candidate words and confidence values, for example, based on a likelihood that a user is using domain-specific or general speech (e.g., as determined from previous portions of the incremental speech, based on user patterns such as time of day or viewing context, or based on other data such as supplemental information received from other input devices). Based on the candidate words and confidence values from the respective ASRs, and other biasing if applied, the system may select one or more words for the segment of incremental speech. In some instances, portions of speech preceding the newly selected one or more words may be updated, for example, based on updated confidence values for sequence aware general and domain-specific ASRs.

Figure 1:
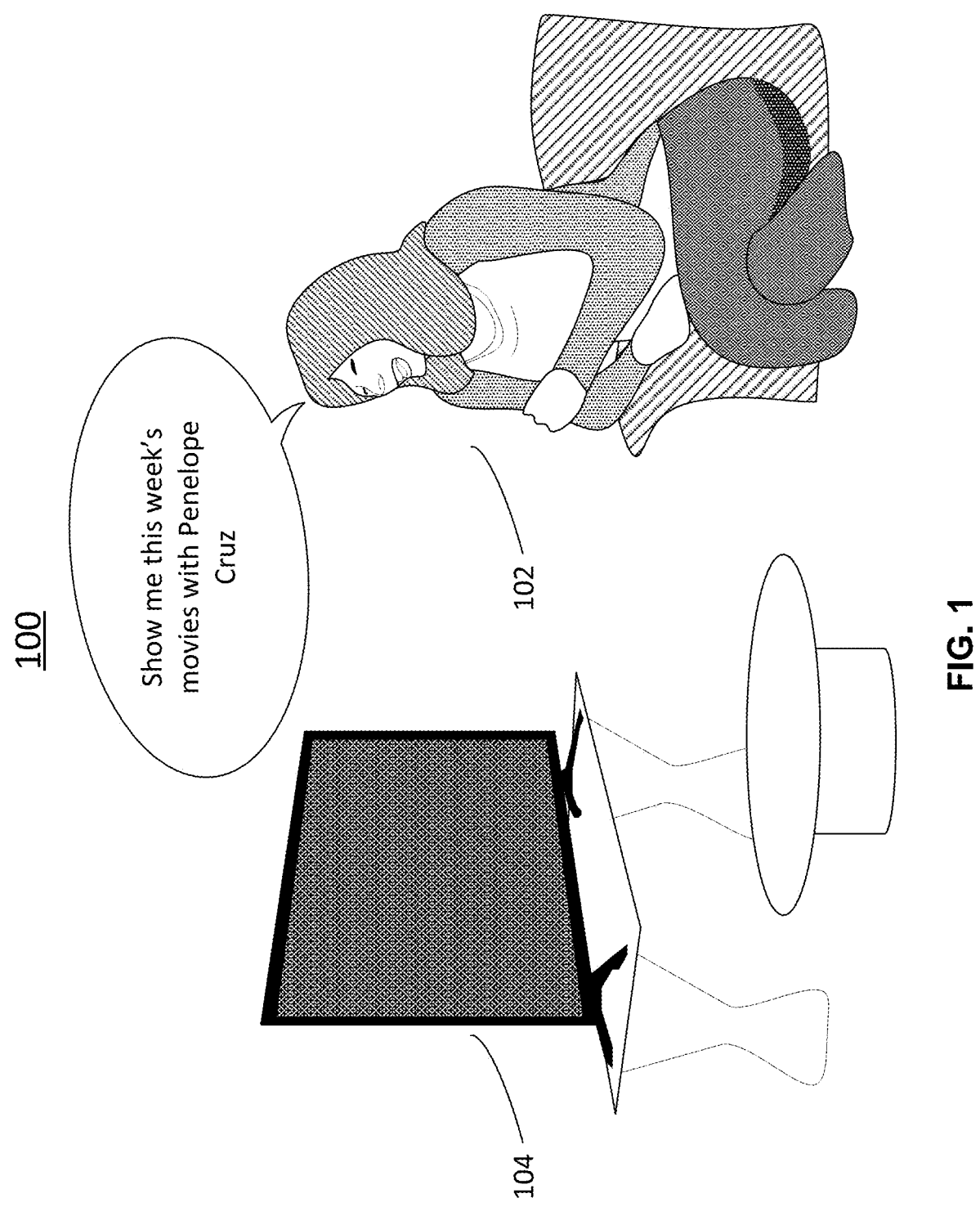
FIG. 1 shows an illustrative embodiment of a user providing a spoken input to a user equipment device, in accordance with some embodiments of the disclosure.

FIG. 1 shows an illustrative embodiment of a user providing a spoken input to a user equipment device, in accordance with some embodiments of the disclosure. In an exemplary embodiment, the user 102 is speaking in an environment that includes a user equipment device 104 such as a smart television, although the speech processing as described herein may be performed by a variety of devices or a combination thereof, including suitable hardware (e.g., microphones) for receiving speech input from a user and control circuitry (e.g., locally on the user equipment device, on another user equipment device via communication over a local network, or on a remote device such as a remote server of a service provider accessible via communication over a communication network.

The speech recognition may be performed at a variety of times and intervals, such as whenever the user equipment device 104 has power (e.g., a passive listening device), when the user equipment device 104 is active (e.g., based on a user interaction device, the detection of speech in proximity to the device, or another external stimulus to initiate speech recognition), or in response to an explicit or implicit request to perform speech recognition (e.g., a user selecting a button or command to initiate speech recognition, or accessing an application that uses speech recognition).

Once speech recognition is initiated, the speech may be processed in a batched or incremental format, depending on the end use application, processing capabilities, and particular ASRs used. For example, batched processing may be utilized where a time-sensitive result (e.g., real-time display of the speech on a screen or real-time control of a game or menu) is not required, or where a local device receives and transcodes speech for remote processing (e.g., for later batched association of viewers' speech with displayed portions of media assets). Batch processing may also be implemented where the speech is likely to follow a given command format (e.g., with particular speech patterns and commands that are easily recognized), although incremental speech recognition is also suitable for such applications. In some embodiments, incremental speech recognition may be utilized in real-time applications in which a most recent word or phrase is displayed immediately or immediately used for a resulting action such as performing a search request, navigating menus, or performing steps in a game. In some embodiments, incremental speech recognition may be utilized where the received speech is likely to include at least partial conversational content that does not correspond to a predetermined command format.

Once the speech is processed, the output may be processed. In an exemplary embodiment of a media guidance application, the processed speech may be used to perform any operations that are typically performed by a remote or by menus of a program guide or application. For example, the user's speech may be analyzed to download content for viewing, provide recommendations, target advertisements, navigate menus, request related information from non-media sources, and interact with other devices and equipment within a user's home. In some embodiments, a domain used for selection of the domain-specific ASR for use in speech processing may be fixed for a device or application, while in other embodiments a domain-specific ASR may be selected from multiple options. The selection of a domain-specific ASR may be based on user interactions that indicate a domain, from analysis of the user's speech, or combinations thereof. In an exemplary embodiment, general speech recognition can analyze a portion of speech and the results analyzed to identify a likely domain. In other embodiments, a user's speech may be provided to multiple domain-specific ASRs and an appropriate domain-specific ASR selected based on relative confidence score outputs.

Figure 2:
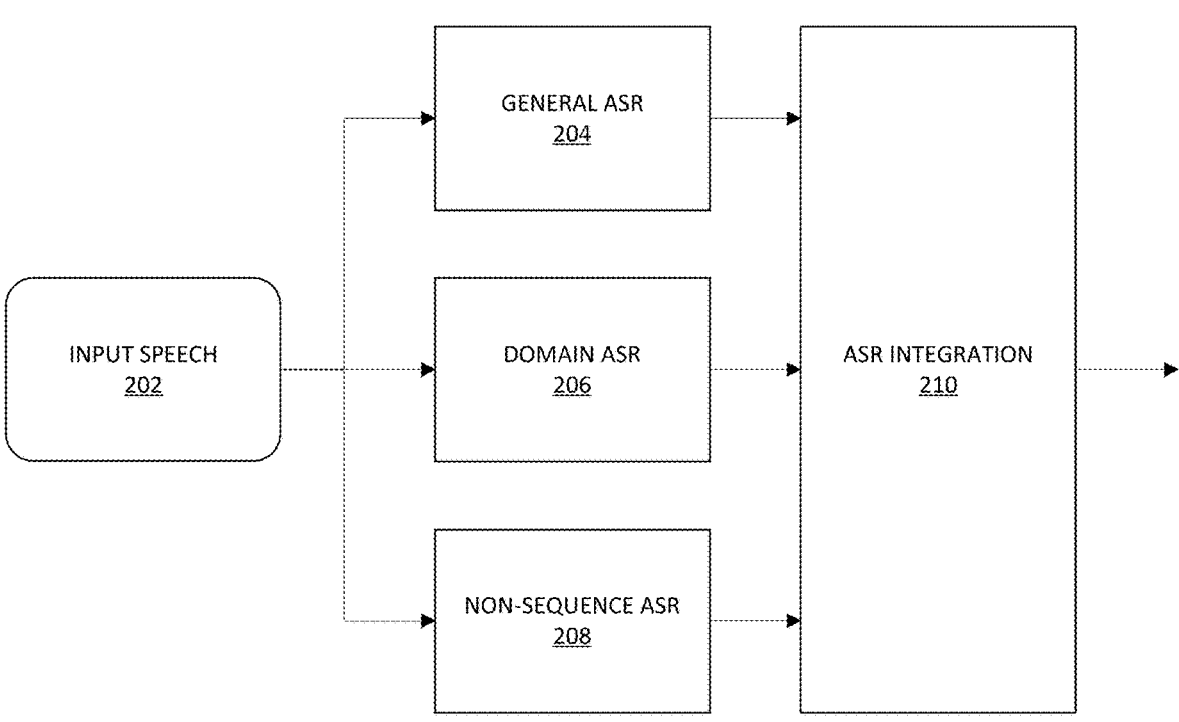
FIG. 2 shows an illustrative embodiment of a multiple ASR speech processing system, in accordance with some embodiments of the disclosure.

FIG. 2 shows an illustrative embodiment of a multiple ASR speech processing system, in accordance with some embodiments of the disclosure. Although a particular combination of multiple ASRs is depicted in FIG. 2, it will be understood that a variety of combinations of ASRs may be utilized in accordance with the present disclosure. For example, different general ASRs using different methodologies may provide different outputs and confidence scores. Domain-specific ASRs may be combined for particular uses or applications, such as combining a sports-focused ASR with a media guidance ASR for a user navigating a media guidance application for management and viewing of sporting events (e.g., selected based on a user profile and recognition of interest in viewing a sporting event identified during conversational speech). Any of the ASRs (e.g., general or domain-specific) may be sequence aware or sequence unaware. In some embodiments, multiple ASRs may be available (e.g., via a local and/or remote network) and may be selectively activated for particular applications and use cases (e.g., based on user profiles, user selections, analysis of user speech, and/or external information sources).

Input speech may be received at a speech input device 202 which may be any suitable microphone or other transducer capable of capturing speech information. The speech input device 202 may be located on a suitable user equipment device. The received speech information may be transcoded and the transcoded speech information provided to control circuitry of a user equipment device such as the user equipment device including the speech input device 202 or another device (e.g., a user equipment device or remote server) accessible via a local or wide area network. Transcoded speech may be provided for processing as segments in a streaming or batched fashion, for example, during spaces between utterances or on a periodic basis.

A segment transcoded speech from the speech input device 202 may be provided to a plurality of ASRs for processing, such as general ASR 204, domain-specific ASR 206, and sequence unaware ASR 208. The respective ASRs 204-208 may be located on a common device (e.g., the user device including the speech input device 202 or a remote server) or may be located on different devices (e.g., a general ASR and sequence unaware ASR on a local device and a remotely accessible domain-specific ASR). In some embodiments, the domain-specific ASR may be selectable based on multiple available domain-specific ASRs. In the exemplary embodiment described in the context of FIGS. 1-3, the domain-specific ASR may be a sequence aware media guidance ASR.

General ASR 204 may be a sequence aware ASR and may receive the segment of transcoded input speech, e.g., at control circuitry executing instructions on a user equipment device or remote server. General ASR 204 may process the received segment of transcoded input speech to generate one or more candidate words and one or more associated confidence values. In some embodiments, the output of the general ASR may include multiple candidate words and confidence values (e.g., respective edit distances) for each potential word in the segment of input speech. In instances in which the segment of input speech corresponds to a set of multiple words, each potential word in the segment of input speech may be associated with one or more candidate words and confidence values. Because the general ASR 204 is sequence aware, in some embodiments the confidence values associated with candidate words may be partially contingent on previous or subsequent word selections and confidence values. General ASR 204 may output candidate words and confidence values to ASR integration 210.

Domain-specific ASR 206 may be a sequence aware ASR and may receive the segment of transcoded input speech, e.g., at control circuitry executing instructions on a user equipment device or remote server. Domain-specific ASR 206 may process the received segment of transcoded input speech to generate one or more candidate words and one or more associated confidence values. In some embodiments, the output of the domain ASR may include multiple candidate words and confidence values (e.g., respective edit distances) for each potential word in the segment of input speech as compared to a corpus of domain-specific words. For example, a media guidance ASR may include a limited set of words including information about media assets (e.g., metadata indicating title, genre, plot, actors, characters, run-time, director, studio, etc.), information about media asset sources (e.g., play times, video quality and formats, costs, login information, subscriptions, etc.), information about user equipment devices used for playback (e.g., hardware capabilities, installed applications, available playback operations, etc.), and media guidance operations (e.g., menu navigation operations, playback operations, etc.). Confidence values (e.g., based on respective edit distances) may be calculated with respect to the corpus of domain-specific words. In instances in which the segment of input speech corresponds to a set of multiple words, each potential word in the segment of input speech may be associated with one or more candidate words and confidence values. In instances where the domain-specific ASR 206 is sequence aware, in some embodiments the confidence values associated with candidate words may be partially contingent on previous or subsequent word selections and confidence values. Domain-specific ASR 206 may output candidate words and confidence values to ASR integration 210.

Sequence unaware ASR 208 may receive the segment of transcoded input speech, e.g., at control circuitry executing instructions on a user equipment device or remote server. Sequence unaware ASR 208 may process the received segment of transcoded input speech to generate one or more candidate words and one or more associated confidence values. In some embodiments, the output of the general ASR may include multiple candidate words and confidence values (e.g., respective edit distances) for each potential word in the segment of input speech. In instances in which the segment of input speech corresponds to a set of multiple words, each potential word in the segment of input speech may be associated with one or more candidate words and confidence values. Because the ASR 208 is sequence unaware, the confidence values associated with candidate words are determined without regard to adjacent selected words and or other confidence values. Sequence unaware ASR 208 may output candidate words and confidence values to ASR integration 210.

ASR integration 210 may receive candidate words and associated confidence values from a plurality of ASRs, such as general ASR 204, domain-specific ASR 206, and sequence unaware ASR 208. ASR integration 210 may be located locally with any or all of the input speech device 202 and ASRs as components (e.g., instructions executing on control circuitry) of a common device (e.g., a user equipment device) or on a local network. In some embodiments, ASR integration 210 may be located remotely from some or all of the other components of the speech processing system, for example, as a service executing on a remote server. ASR integration 210 may process the received candidate words and confidence values to generate a composite output. In some embodiments, ASR integration 210 may select the candidate word with the best confidence value (e.g., highest confidence value). In other embodiments, bias may be introduced into the selection such that confidence values received from a particular ASR source are modified (e.g., proportionally increased), or to perform a tie-breaking function. For example, during initial processing of conversational speech, the confidence values of general ASR 204 may receive additional weighting, whereas domain-specific ASR 206 confidence values receive increased weighting once sufficient information (e.g., a threshold number or percentage of words) indicates that the received speech relates to the domain. Sequence unaware 208 may also receive increased weighting, for example, based on speech patterns indicating that the user's speech is relatively terse or choppy. In a similar manner, the general ASR 204 outputs may receive additional weighting for speech patterns that are more narrative or conversational.

ASR integration 210 outputs the selected candidate words for further processing by other programs and processes, such as a media guidance application, a vehicle control system, a smart home controller, kitchen appliances, or retail operations. The output may be apportioned in a variety manners, for example, by providing only the word or words corresponding to the most recent portion of speech or by providing particular portions of speech, such as phrases or sentences. In some instances, for example, where a previously provided word has been modified (e.g., based on sequence aware modifications to prior words due to a high-confidence later word), one or more flags or indicators may be provided by the ASR integration 210 to trigger processing by the recipient program or process. Other flags may be provided to other programs and processes, for example, to highlight words associated with high or low confidence values, to highlight likely commands or selections of domain-specific words, or to provide information regarding the ASR integration (e.g., implementation of domain-specific biasing based on reception of a threshold portion of domain-specific words). ASR integration may also receive information to influence its processing and selections (e.g., biasing) from other processes and programs (e.g., based on user selections, results determined by other programs and processes, etc.).

FIG. 3 shows an illustrative embodiment of incremental speech processing for a media guidance application with multiple ASRs, in accordance with some embodiments of the disclosure. In the exemplary embodiment of FIG. 3, incremental speech processing is applied using a sequence aware general ASR, sequence aware domain-specific ASR, and sequence unaware general ASR. The user's input speech is depicted in column 302, with incremental speech input depicted in rows 320-334. Column 304 corresponds to ASR results and column 306 corresponds to confidence factors. Each of rows 320-334 includes 3 sub-rows corresponding to the ASR results column 304 and confidence factor column 306, with the top sub-row (i.e., sub-row 310 in row 320) corresponding to output from a sequence aware general ASR, the middle sub-row (i.e., sub-row 312 in row 320) corresponding to output from a sequence aware domain-specific ASR, and bottom sub-row (i.e., sub-row 314 in row 320) corresponding to output from a sequence unaware general ASR.

In row 320, the user has provided input speech of "show." The sequence aware general ASR and sequence aware domain-specific ASR, lacking context to consider in forming a recommendation, may output candidate words of "snow" and "show," each with respective confidence values of 0.4. The sequence unaware ASR may correctly recognize the input speech as corresponding to "show" and may have a relatively higher confidence value of 0.7. The ASR integration may thus select "show" as the initial incremental output corresponding to the speech received in row 320.

In row 322, the user has provided additional input speech of "me." The sequence aware general ASR may be initially working from incorrect context (e.g., the candidate word of "snow") and may thus have difficulty constructing a proper sequence of words including the new input, resulting in a confidence value of 0.2. The confidence value for the domain-specific ASR may increase to 0.6 for the candidate words "show me," based on correspondence to a likely media guidance command. The sequence unaware ASR may properly capture the word "me," providing additional confirmation based on a confidence value of 0.7. As a result, the ASR integration may provide an incremental output in column 308/row 322 of "show me."

In row 324, the user has provided additional input speech of "this." Based on feedback of the previous incremental outputs, the sequence aware general ASR may correctly identify "this" as a candidate word with a confidence value of 0.6. The sequence unaware general ASR may recognize "this" as a candidate word with a confidence value 0.7. The domain-specific ASR may not recognize "this," for example, based on "this" lacking a correspondence to common usage in the media guidance application of the domain-specific ASR, and may instead identify "miss" (e.g., as in, did the user "miss" a show) with a low confidence value of 0.3. Based on the multiple high confidence values for "this," the ASR integration may provide an incremental output in column 308/row 324 of "show me this."

In row 326, the user has provided additional input speech of "week's." Both of the sequence aware ASRs (general and domain-specific) may recognize the common sequenced speech of "this week's" including recognition that "week's" is possessive based on the related context. The resulting respective confidence values of 0.7 and 0.5 may be based in part on the confidence from the previous analysis of "this." The sequence unaware ASR may identify the most recent word as "weak" and may have a relatively high confidence value of 0.6, for example, based on the user not pronouncing the ending "s" clearly or emphatically. The ASR integration may nonetheless select "week's" for output based on the relative scores and the agreement between the sequence aware general and domain-specific ASRs. Thus, the resulting complete incremental output corresponding to column 308/row 326 may be "show me this week's."

In row 328, the user has provided additional input speech of "movies." The domain-specific ASR may recognize this speech as corresponding to "movies" with a high confidence value of 0.8, for example, based on a limited number of options having a similar sound profile within the domain-specific ASR. Both of the general ASRs (sequence aware and sequence unaware) may recognize the input speech as "moves" but with relatively low confidence values of 0.4 and 0.5, respectively. Based on these confidence values, the resulting complete incremental output corresponding to column 308/row 328 may be "show me this week's movies."

In row 330, the user has provided additional input speech of "with." Both of the sequence aware ASRs (general and domain-specific) may recognize the common sequenced speech of "movies with," in view of the previous inclusion of "movies" as the last word in the previous output, resulting in respective confidence values of 0.7 and 0.6. The sequence unaware ASR may identify the most recent word as "this" and may have a relatively low confidence value of 0.4. The ASR integration may select "with" for output based on the relative scores and the agreement between the sequence aware general and domain-specific ASRs. Thus, the resulting complement incremental output corresponding to column 308/row 326 may be "show me this week's movies with."

In row 332, the user has provided additional input speech of "Penelope." The domain-specific ASR may recognize this speech as corresponding to "Penelope" with a high confidence value of 0.8, for example, based on the use of the name "Penelope" in media asset titles and in the names of actresses. Both of the general ASRs (sequence aware and sequence unaware) may recognize the input speech as "panoply" but with relatively low confidence values of 0.3 and 0.2, for example, based on a large edit distance between the raw speech data and the most likely selection of panoply. Based on these confidence values, the resulting complete incremental output corresponding to column 308/row 332 may be "show me this week's movies with Penelope."

In row 334, the user has provided additional input speech of "Cruz." The domain-specific ASR may recognize this speech as corresponding to "Cruz" with a high confidence value of 0.9, for example, based on the use of the name "Cruz" by actors and actresses and the correspondence to the previous word "Penelope" for the actress Penelope Cruz. The sequence aware general ASR may recognize the input speech as "cruise" but may nonetheless provide a low confidence value of 0.2, based on a lack of usage of "panoply" (the previous candidate word from the sequence aware ASR) in sequence with the word "cruise." The sequence unaware ASR may output a candidate word of "cruise" with a relatively high confidence value of 0.8. The ASR integration may select the output from the domain-specific ASR based on the high confidence value, and also based on an applied bias due to previous language (e.g., "show me this week's movies") being indicative that the user is using vocabulary specific to the media guidance domain. The resulting complete incremental output corresponding to column 308/row 334 may be "show me this week's movies with Penelope Cruz."

Figure 4:
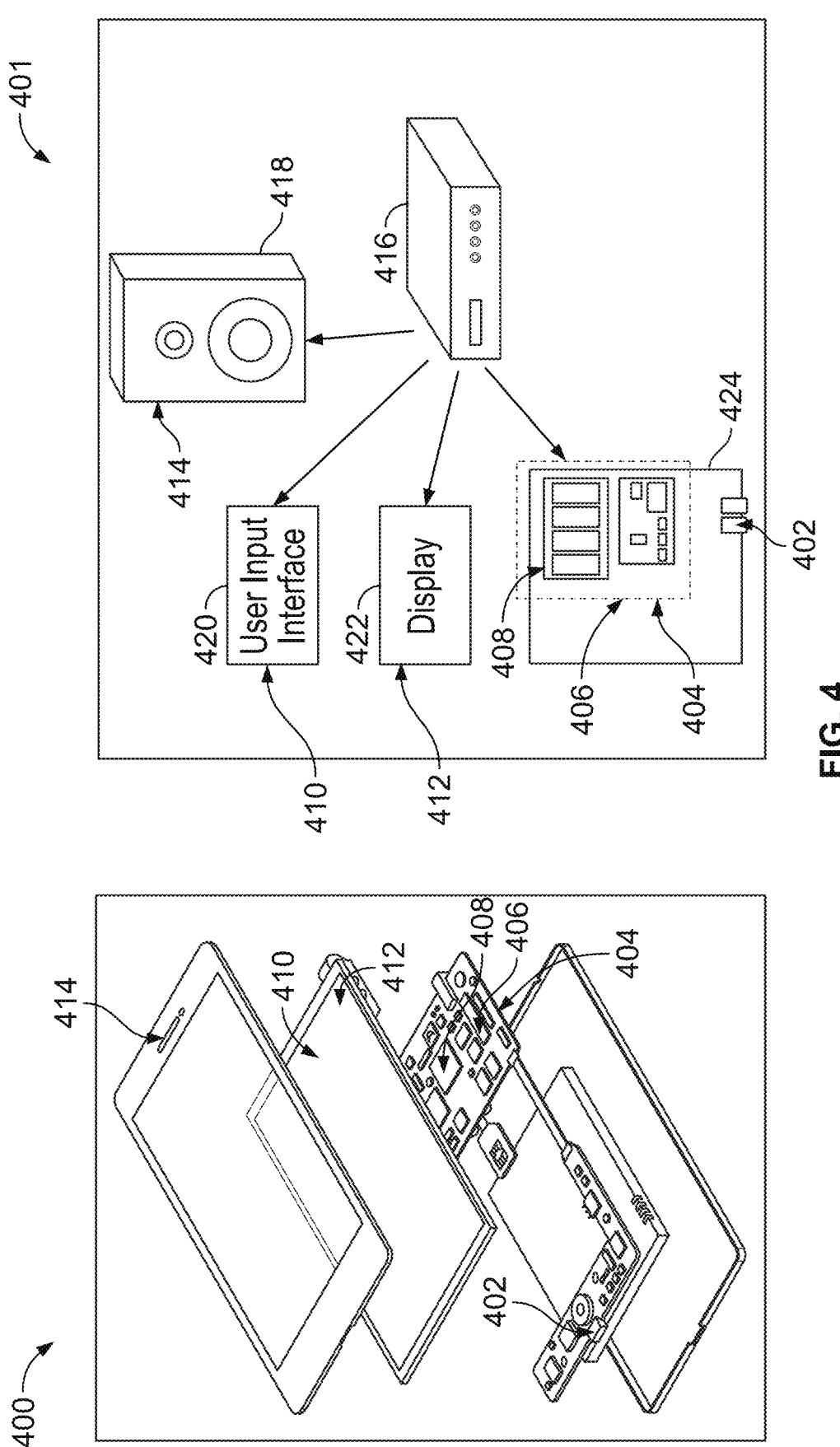
FIG. 4 is a block diagram of an illustrative user equipment (UE) device, in accordance with some embodiments of the disclosure.
Figure 5:
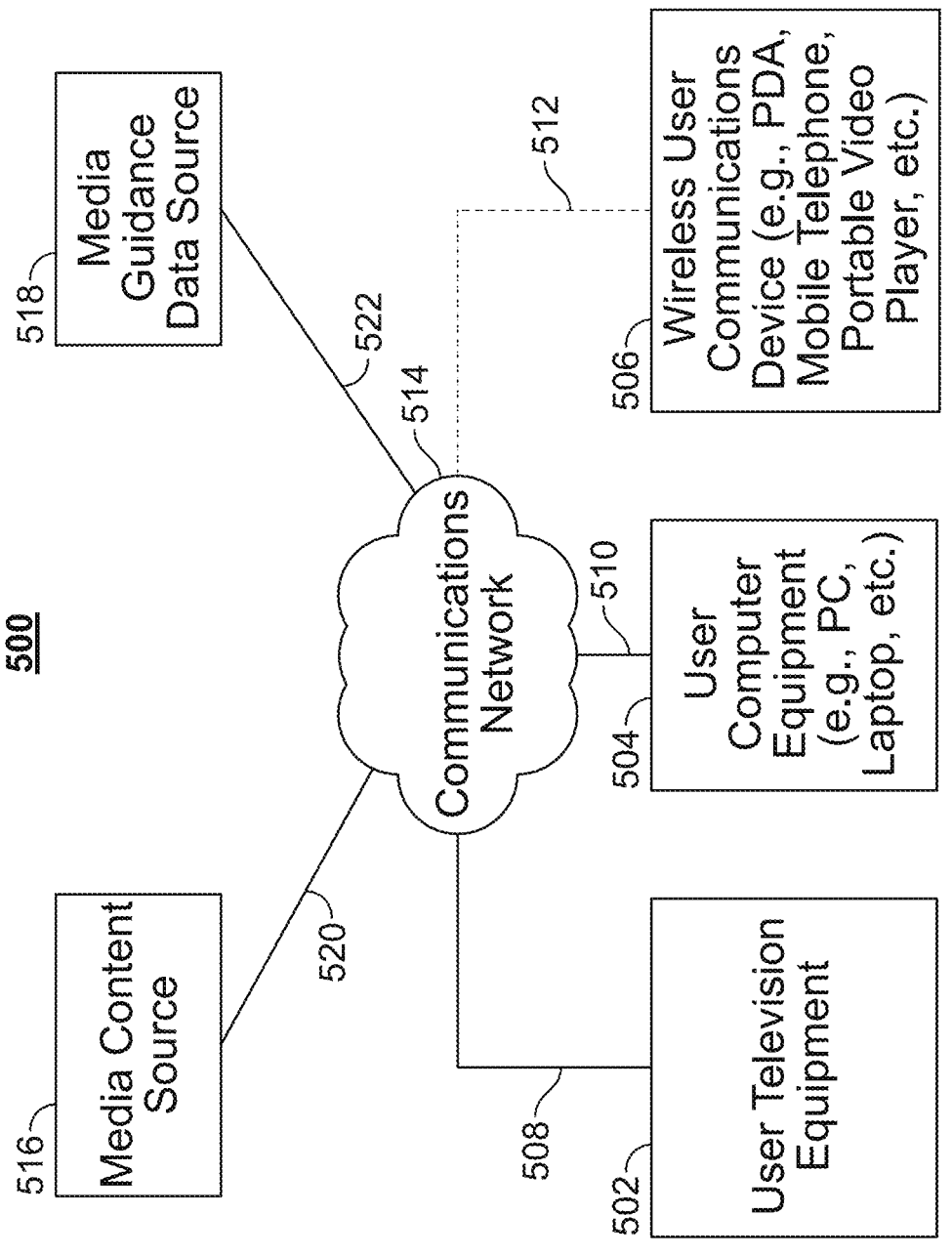
FIG. 5 is a block diagram of an illustrative media system, in accordance with some embodiments of the disclosure.

FIGS. 4-5 describe exemplary devices, systems, servers, and related hardware for creating, distributing, analyzing, and displaying media assets and content in accordance with the present disclosure. Such devices may interact with the speech recognition devices and methods described herein. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, a user interface in accordance with the present disclosure may be available on these devices, as well. The user interface may be for content available only through a television, for content available only through one or more of other types of user equipment devices, or for content available both through a television and one or more of the other types of user equipment devices. The user interfaces described herein may be provided as online applications (i.e., provided on a web-site), or as stand-alone applications or clients on user equipment devices. Various devices and platforms that may implement the present disclosure are described in more detail below.

The devices and systems described herein may allow a user to provide user profile information or may automatically compile user profile information. An application may, for example, monitor the content the user accesses and/or other interactions the user may have with the system and media assets provided through the system. Additionally, the application may obtain all or part of other user profiles that are related to a particular user (e.g., from other websites on the Internet the user accesses, such as www.Tivo.com, from other applications the user accesses, from other interactive applications the user accesses, from another user equipment device of the user, etc.), and/or obtain information about the user from other sources that the application may access. As a result, a user can be provided with a unified experience across the user's different user equipment devices. Additional personalized application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Users may access content and applications from one or more of their user equipment devices. FIG. 4 shows generalized embodiments of illustrative user equipment device 400 and illustrative user equipment system 401. For example, user equipment device 400 can be a smartphone device. In another example, user equipment system 401 can be a user television equipment system. In another example, user equipment system 401 may be in-vehicle entertainment system and/or vehicle control system. User equipment system 401 may comprise a set top box 416. Set top box 416 may be communicatively connected to speaker 418 and display 422. In some embodiments, display 422 may be a television display or a computer display. In some embodiments, set top box 416 may be communicatively connected to user interface input 420. In some embodiments, user interface input 420 may be a remote control device. Set top box 416 may include circuit board 424. In some embodiments, circuit board 424 may include processing circuitry, control circuitry, and storage (e.g., RAM, ROM, Hard Disk, Removable Disk, etc.). In some embodiments, circuit board 424 may include an input/output path. Additional implementations of user equipment devices are discussed below in connection with FIG. 5. Each one of user equipment device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communication paths (described below). I/O functions may be provided by one or more of these communication paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (i.e., storage 408). Specifically, control circuitry 404 may be instructed by applications to perform the functions discussed above and below. For example, applications may provide instructions to control circuitry 404 to generate displays. In some implementations, any action performed by control circuitry 404 may be based on instructions received from the applications.

In client/server-based embodiments, control circuitry 404 may include communications circuitry suitable for communicating with an application server or other networks or servers. The instructions for carrying out the above-mentioned functionality may be stored on the application server. Communications circuitry may include a cable modem, an integrated services digital network (ISDN) modem, a digital subscriber line (DSL) modem, telephone modem, Ethernet card, or wireless modem for communications with other equipment, or any other suitable communications circuitry. Such communications may involve the Internet or any other suitable communications networks or paths (which are described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of each one of user equipment device 400 and user equipment system 401. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from each one of user equipment device 400 and user equipment system 401, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, microphone, voice recognition interface, or other user input interfaces. Display 412 may be provided as a stand-alone device or integrated with other elements of each one of user equipment device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of user equipment device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

Applications may be implemented using any suitable architecture. For example, they may be stand-alone applications wholly implemented on each one of user equipment device 400 and user equipment system 401. In such an approach, instructions of the applications are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the application is a client/server-based application. Data for use by a thick or thin client implemented on each one of user equipment device 400 and user equipment system 401 is retrieved on demand by issuing requests to a server remote to each one of the user equipment device 400 and the user equipment system 401. In one example of a client/server-based application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on each one of equipment device 400 and equipment system 401. This way, the processing of the instructions is performed remotely by the server while the resulting displays are provided locally on each one of equipment device 400 and equipment system 401. Each one of equipment device 400 and equipment system 401 may receive inputs from the user via input interface 410 and transmit those inputs to the remote server for processing and generating the corresponding displays. For example, each one of equipment device 400 and equipment system 401 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to each one of equipment device 400 and equipment system 401 for presentation to the user.

In some embodiments, the application is downloaded and interpreted or otherwise run by an interpreter or virtual machine (run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404. In some of such embodiments (e.g., those employing MPEG-2 or other digital media encoding schemes), the application may be, for example, encoded and transmitted in an MPEG-2 object carousel with the MPEG audio and video packets of a program.

Each one of user equipment device 400 and user equipment system 401 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which an application may be implemented, may function as stand-alone devices or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or wireless user communications device 506. For example, user television equipment 502 may, like some user computer equipment 504, be Internet-enabled, allowing for access to Internet content, while user computer equipment 504 may, like some television equipment 502, include a tuner allowing for access to television programming. Applications may have the same layout on various different types of user equipment or may be tailored to the display capabilities of the user equipment. For example, on user computer equipment 504, applications may be provided as a website accessed by a web browser. In another example, applications may be scaled down for wireless user communications devices 506.

In system 500, there are typically more than one of each type of user equipment device, but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, speech may be monitored from any of the user equipment devices and communicated between the devices for processing as described herein.

The user may also set various settings to maintain consistent application settings across in-home devices and remote devices. Settings include those described herein, as well as channel and program favorites, programming preferences that the application utilizes to make programming recommendations, display preferences, and other desirable guidance settings such as settings related to integration of domain-specific speech recognition with general ASRs. For example, a user may maintain a variety of settings related to a domain-specific ASR and integration of multiple ASRs, such as selection of certain domain vocabulary to be utilized by the domain-specific ASR, associations between actions or applications and particular domains, biasing factors for combining ASR results, associations between applications and domain-specific ASRs, and other related settings and information as described herein. Changes made on one user equipment device can change the guidance experience on another user equipment device, regardless of whether they are the same or a different type of user equipment device. In addition, the changes made may be based on settings input by a user, as well as user activity monitored by applications.

The user equipment devices may be coupled to communications network 514. Namely, user television equipment 502, user computer equipment 504, and wireless user communications device 506 are coupled to communications network 514 via communication paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Path 512 is drawn with dotted lines to indicate that in the exemplary embodiment shown in FIG. 5 it is a wireless path, and paths 508 and 510 are drawn as solid lines to indicate they are wired paths (although these paths may be wireless paths, if desired). Communications with the user equipment devices may be provided by one or more of these communication paths, but are shown as single paths in FIG. 5 to avoid overcomplicating the drawing.

Although communication paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516 and media guidance data source 518 coupled to communications network 514 via communication paths 520 and 522, respectively. Paths 520 and 522 may include any of the communication paths described above in connection with paths 508, 510, and 512. Communications with content source 516 and data source 518 may be exchanged over one or more communication paths, but are shown as single paths in FIG. 5 to avoid overcomplicating the drawing. In addition, there may be more than one of each of content source 516 and data source 518, but only one of each is shown in FIG. 5 to avoid overcomplicating the drawing. (The different types of each of these sources are discussed below.) If desired, content source 516 and data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Data source 518 may provide domain-specific data, such as vocabulary and instructions for operating a domain-specific ASR. In some embodiments, domain-specific data from data source 518 may be provided to users' equipment using a client-server approach. For example, a user equipment device may pull data from a server, or a server may push data to a user equipment device. In some embodiments, an application client residing on the user's equipment may initiate sessions with data source 518 to obtain domain-specific data when needed, e.g., when a user takes action or provides speech that initiates an interface with a particular domain. Communication between data source 518 and the user equipment may be provided with any suitable frequency (e.g., continuously, daily, a user-specified period of time, a system-specified period of time, in response to a request from user equipment, etc.).

In some embodiments, data received by data source 518 may include viewer data that may be used as training data. For example, the viewer data may include current and/or historical user activity information related to portions of media assets and related user speech. In some embodiments, the user activity information may include data from a second device, such as speech from a user or other users. The data may also include selections prompted by the application, such as selections of a domain.

Applications may be, for example, stand-alone applications implemented on user equipment devices. For example, the application may be implemented as software or a set of executable instructions which may be stored in storage 408 and executed by control circuitry 404 of each one of a user equipment device 400 and 401. In some embodiments, applications may be client-server applications where only a client application resides on the user equipment device, and the server application resides on a remote server. For example, applications may be implemented partially as a client application on control circuitry 404 of each one of user equipment device 400 and user equipment system 401 and partially on a remote server as a server application (e.g., data source 518) running on control circuitry of the remote server. When executed by control circuitry of the remote server (such as data source 518), the server application may instruct the control circuitry to generate the application displays and transmit the generated displays to the user equipment devices. The server application may instruct the control circuitry of data source 518 to transmit data for storage on the user equipment. The client application may instruct control circuitry of the receiving user equipment to generate the application displays.

Content and/or data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOU-TUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide data described above. In addition to content and/or data, providers of OTT content can distribute applications (e.g., web-based applications or cloud-based applications), or the content can be displayed by applications stored on the user equipment device.

Figure 8:
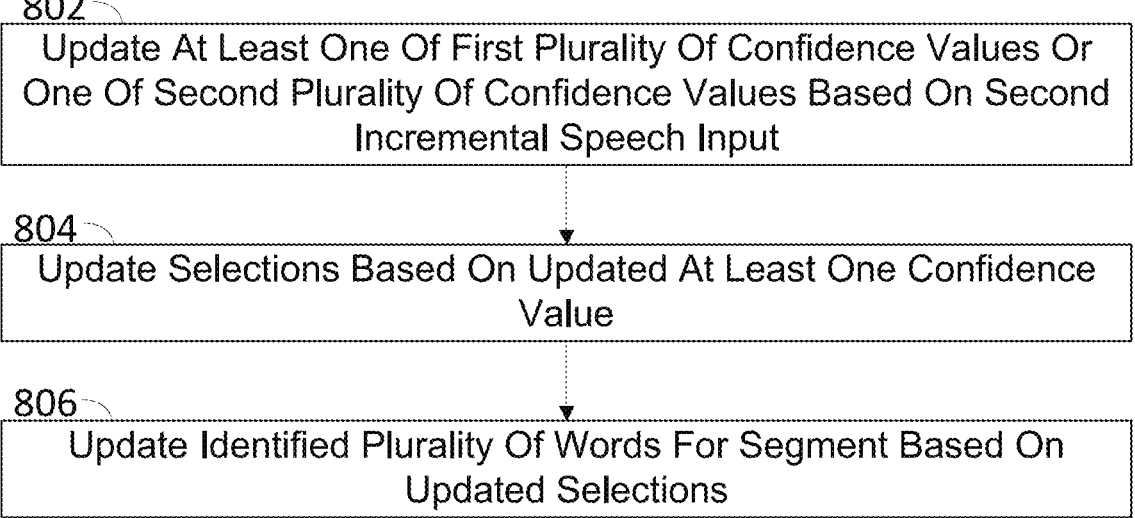
FIG. 8 is a flowchart of a process for updating previous ASR results based on incremental speech results, in accordance with some embodiments of the present disclosure.

FIGS. 6-8 are flowcharts relating to ASR systems and processing in accordance with some embodiments of the disclosure. The processes of FIGS. 6-8 may be executed by any of control circuitry (e.g., control circuitry 404) any computing equipment and devices described herein, such as different types of user equipment, content sources, and data sources as described herein. Although particular steps of these methods may be described herein as being performed by particular equipment or devices, it will be understood that the steps of the processes depicted and described in FIGS. 6-8 or aspects of the steps therein may be performed on different computing equipment and devices and data exchanged over communications networks as described herein.

FIG. 6 is a flowchart of a process for processing of input speech using multiple ASRs, in accordance with some embodiments of the disclosure. In the exemplary embodiment of FIG. 6, received speech may be processed by a sequence aware general ASR and a domain-specific ASR for a media guidance application, although it will be understood that different ASRs may be utilized in different embodiments of the present disclosure as described herein. At step 602, monitoring of speech may be initiated (e.g., based on a user input, speech volume exceeding a threshold, commands, or another similar stimulus) and a segment of a user's speech may be received, for example, by a microphone of a user equipment device in proximity to the user. The received speech may be processed and transcoded into a format suitable for processing by ASRs, or, in some embodiments, for communication with other local or remote devices. Processing may then continue to step 604.

At step 604, a sequence aware general ASR may analyze the segment of user speech to identify a plurality of candidate words from the segment of speech. At step 606, confidence values may be determined for each of the plurality of candidate words, for example, based on respective edit distances between the received segment of speech and the candidate words. As described herein, the sequence aware general ASR may consider adjacent speech in selecting candidate words and calculating confidence value. Processing may then continue to step 608.

At step 608, a domain-specific ASR may analyze the segment of user speech to identify a plurality of second candidate words from the segment of speech. At step 610, second confidence values may be determined for each of the plurality of second candidate words, for example, based on respective edit distances between the received segment of speech and the candidate domain-specific words. As described herein, the domain-specific ASR may determine the candidate words and calculate confidence values based on domain-specific data and analysis. Processing may then continue to step 612.

At step 612, at least one candidate word and confidence value from each of the sequence aware general ASR and domain-specific ASR may be analyzed to select one or more words as an output associated with the segment of speech. In some embodiments, multiple candidate words and associated confidence values may be received from one or both of the ASRs, such that common words shared between the ASRs may be considered by the ASR integration, rather than considering only the highest-rated candidate words from each ASR. In some embodiments, sequence awareness may be applied at the selection stage, in addition to any sequence awareness applied by the individual ASRs. In some embodiments, biasing may be applied to one or more of the confidence values as described herein. Once one or more words are selected as an output for the segment of speech, processing may continue to step 614.

At step 614, the speech recognition system may be updated based on the output results. For example, previous outputs may be updated based on sequence aware analysis of the latest result with previous outputs. The results may also be fed back into the system, for example, to any sequence aware ASRs to consider the actual selected result as opposed to the ASR's previous result. Bias factors and selection of ASRs may also be updated.

FIG. 7 is a flowchart of a process for incremental processing of input speech using multiple ASRs, in accordance with some embodiments of the disclosure. In the exemplary embodiment of FIG. 6, received speech may be processed by a sequence aware general ASR and a domain-specific ASR for a media guidance application, although it will be understood that different ASRs may be utilized in different embodiments of the present disclosure as described herein. In the embodiment of FIG. 7, an initial segment of speech may correspond to first incremental speech. At step 702, a second incremental speech input may be received for further processing. For example, portions of incremental speech may be processed periodically or during breaks in speech such as between spoken words. The received speech may be processed and transcoded into a format suitable for processing by ASRs, or in some embodiments, for communication with other local or remote devices. Processing may then continue to step 704.

At step 704, a sequence aware general ASR may analyze the second segment of user speech to identify additional candidate words from the second segment of speech. At step 706, confidence values may be determined for each of the additional candidate words, for example, based on respective edit distances between the received segment of speech and the candidate words as well as edit distances associated with prior words in the sequence. Processing may then continue to step 708.

At step 708, a domain-specific ASR may analyze the second segment of user speech to identify additional of candidate words from the second segment of speech. At step 710, confidence values may be determined for each of the plurality of candidate words, for example, based on respective edit distances between the received segment of speech and the candidate domain-specific words. Processing may then continue to step 712.

At step 712, at least one candidate word and confidence value from each of the sequence aware general ASR and domain-specific ASR may be analyzed to select one or more words as an output associated with the second segment of speech. In some embodiments, multiple candidate words and associated confidence values may be received from one or both of the ASRs, such that common words shared between the ASRs may be considered by the ASR integration, rather than considering only the highest-rated candidate words from each ASR. In some embodiments, sequence awareness may be applied at the selection stage, in addition to any sequence awareness applied by the individual ASRs. The sequence awareness may be applied to each incremental speech input as it is analyzed. In some embodiments, biasing may be applied to one or more of the confidence values as described herein. Once one or more words are selected as an output for the segment of speech, processing may continue to step 714.

At step 714, the speech recognition system may be updated based on the output results. For example, previous outputs may be updated based on sequence aware analysis of the latest incremental result with previous outputs. The results may also be fed back into the system, for example, to any sequence aware ASRs to consider the actual selected result as opposed to the ASR's previous result. Bias factors and selection of ASRs may also be updated.

FIG. 8 is a flowchart of a process for updating previous ASR results based on incremental speech results, in accordance with some embodiments of the present disclosure. The steps of FIG. 8 may be performed at the ASR level (e.g., by a sequence aware ASR) and/or in processing by ASR integration. In the exemplary embodiment of FIG. 8, candidate words and confidence values have previously been determined for adjacent portions of incremental speech and retained for later sequence aware processing. At step 802, confidence values may be updated based on associations between candidate words and confidence values. For example, related candidate words having a strong association (e.g., a value associated with sequential usage) may have their confidence values increased, while candidate words having a weak association may have associated confidence values decreased. Processing may then continue to step 804, at which the selection of candidate words is updated based on the updated confidence values. This update may include changes to previously selected words. Predictive weightings may also be provided for likely words that will be received subsequently. At step 806, the output plurality of words for the incremental speech may be updated and provided as an output for further processing by an application such as a media guidance application, as described herein.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, comprising:

receiving, by a control circuitry, an incremental speech input of a user;

transcoding the incremental speech input into a format compatible with speech recognition processing by the control circuitry;

identifying, by a first speech recognition, a first additional candidate word based on the incremental speech input;

determining a first confidence value for the first additional candidate word;

identifying, by a second speech recognition, a second additional candidate word based on the incremental speech input;

determining a second confidence value for the second additional candidate word;

determining a speech type and simultaneously a speech pattern of the incremental speech input, wherein the speech pattern comprises at least one of (i) terse speech or (ii) choppy speech;

modifying a weight associated with the first confidence value or a weight associated with the second confidence value based on the determined speech type and the speech pattern of the incremental speech input;

selecting at least one candidate word from each of the first additional candidate word and the second additional candidate word based on the first confidence value and the associated weight of the first confidence value and the second confidence value and the associated weight of the second confidence value; and providing, to the control circuitry, the selected at least one candidate word as an incremental output.

2. The method of claim 1, further comprising:

updating, based on the incremental output, at least one of the first speech recognition and the second speech recognition.

3. The method of claim 1, wherein the at least one candidate word is further selected based on shared additional candidate words that are included in both the first speech recognition and the second speech recognition.

4. The method of claim 1, wherein the first speech recognition is a general speech recognition and the second speech recognition is a domain-specific speech recognition.

5. The method of claim 4, wherein the domain-specific speech recognition comprises a plurality of metadata types for each of a plurality of media assets.

6. The method of claim 1, wherein the speech pattern comprises at least one of: terse, choppy, narrative, and conversational.

7. The method of claim 1, wherein the first confidence value and the second confidence value are based on an edit distance between the incremental speech input and the first additional candidate word and second additional candidate word, as well as edit distances associated with prior words in the incremental speech input.

8. The method of claim 1, wherein at least one of the first speech recognition and the second speech recognition is a sequence aware speech recognition.

9. The method of claim 1, further comprising:

processing the incremental output by a media guidance application.

10. The method of claim 1, wherein the first speech recognition is sequence aware, and wherein the method further comprises:

identifying, by sequence unaware speech recognition, a third additional candidate word from the incremental speech input;

determining, by the sequence unaware speech recognition, a third confidence value, for the third additional candidate word;

comparing the third confidence value with one or more of the first confidence value and the second confidence value; and selecting, based on the comparing of the third confidence value, at least one of the first additional candidate word, the second additional candidate word, and the third additional candidate word as the incremental output.

11. A system for identifying words from speech of a user, the system comprising:

control circuitry configured to:

receive an incremental speech input of a user;

transcode the incremental speech input into a format compatible with speech recognition processing by the control circuitry;

identify, by a first speech recognition, a first additional candidate word based on the incremental speech input;

determine a first confidence value for the first additional candidate word;

identify, by a second speech recognition, a second additional candidate word based on the incremental speech input;

determine a second confidence value for the second additional candidate word;

determine a speech type and simultaneously a speech pattern of the incremental speech input, wherein the speech pattern comprises at least one of (i) terse speech or (ii) choppy speech;

modify a weight associated with the first confidence value or a weight associated with the second confidence value based on the determined speech type and the speech pattern of the incremental speech input;

select at least one candidate word from each of the first additional candidate word and the second additional candidate word based on the first confidence value and the associated weight of the first confidence value and the second confidence value and the associated weight of the second confidence value; and provide the selected at least one candidate word as an incremental output.

12. The system of claim 11, wherein the control circuitry is further configured to:

update, based on the incremental output, at least one of the first speech recognition and the second speech recognition.

13. The system of claim 11, wherein the at least one candidate word is further selected based on shared additional candidate words that are included in both the first speech recognition and the second speech recognition.

14. The system of claim 11, wherein the first speech recognition is a general speech recognition and the second speech recognition is a domain-specific speech recognition.

15. The system of claim 14, wherein the domain-specific speech recognition comprises a plurality of metadata types for each of a plurality of media assets.

16. The system of claim 11, wherein the speech pattern comprises at least one of: terse, choppy, narrative, and conversational.

17. The system of claim 11, wherein the first confidence value and the second confidence value are based on an edit distance between the incremental speech input and the first additional candidate word and second additional candidate word, as well as edit distances associated with prior words in the incremental speech input.

18. The system of claim 11, wherein at least one of the first speech recognition and the second speech recognition is a sequence aware speech recognition.

19. The system of claim 11, wherein the control circuitry is further configured to:

process the incremental output by a media guidance application.

20. The system of claim 11, wherein the first speech recognition is sequence aware, and wherein the control circuitry is further configured to:

identify, by sequence unaware speech recognition, a third additional candidate word from the incremental speech input;

determine, by the sequence unaware speech recognition, a third confidence value, for the third additional candidate word;

compare the third confidence value with one or more of the first confidence value and the second confidence value; and select, based on the comparing of the third confidence value, at least one of the first additional candidate word, the second additional candidate word, and the third additional candidate word as the incremental output.

* * * * *